United States Patent
Steinberg et al.

(10) Patent No.: US 10,191,861 B1
(45) Date of Patent: Jan. 29, 2019

(54) TECHNIQUE FOR IMPLEMENTING MEMORY VIEWS USING A LAYERED VIRTUALIZATION ARCHITECTURE

(71) Applicant: FireEye, Inc., Milpitas, CA (US)

(72) Inventors: Udo Steinberg, Braunschweig (DE); Osman Abdoul Ismael, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 112 days.

(21) Appl. No.: 15/257,704

(22) Filed: Sep. 6, 2016

(51) Int. Cl.
*G06F 12/14* (2006.01)
*G06F 3/06* (2006.01)
(Continued)

(52) U.S. Cl.
CPC .......... *G06F 12/1491* (2013.01); *G06F 3/067* (2013.01); *G06F 3/0622* (2013.01); *G06F 3/0637* (2013.01); *G06F 3/0664* (2013.01); *G06F 9/45558* (2013.01); *G06F 12/1009* (2013.01); *G06F 21/56* (2013.01); *G06F 2009/4557* (2013.01);
(Continued)

(58) Field of Classification Search
CPC .. G06F 3/0631; G06F 3/0644; G06F 9/45533; G06F 9/45558; G06F 2009/45583; G06F 2009/4557; G06F 12/1491; G06F 12/1009; G06F 3/0622; G06F 3/0637; G06F 3/0664; G06F 3/067; G06F 21/56; G06F 2009/45591; G06F 2009/45587
See application file for complete search history.

(56) References Cited

U.S. PATENT DOCUMENTS 8,201,246 B1  6/2012  Wu et al.
8,271,978 B2  9/2012  Bennett et al.
(Continued)

FOREIGN PATENT DOCUMENTS

WO  WO2012/135192  10/2012
WO  WO2012/154664  11/2012
(Continued)

OTHER PUBLICATIONS

Amiri Sani, Ardalan, et al. "I/O paravirtualization at the device file boundary." ACM SIGPLAN Notices 49.4 (2014), pp. 319-332.
(Continued)

*Primary Examiner* — Hiep T Nguyen
(74) *Attorney, Agent, or Firm* — Rutan & Tucker, LLP (57) ABSTRACT

A technique implements memory views using a virtualization layer of a virtualization architecture executing on a node of a network environment. The virtualization layer may include a user mode portion having hyper-processes and a kernel portion having a micro-hypervisor that cooperate to virtualize a guest operating system kernel within a virtual machine (VM) of the node. The micro-hypervisor may further cooperate with the hyper-processes, such as a guest monitor, of the virtualization layer to implement one or more memory views of the VM. As used herein, a memory view is illustratively a hardware resource (i.e., a set of nested page tables) used as a container (i.e., to constrain access to memory of the node) for one or more guest processes of the guest operating system kernel.

19 Claims, 5 Drawing Sheets

(51) Int. Cl.
G06F 12/1009 (2016.01)
G06F 21/56 (2013.01)
G06F 9/455 (2018.01)

(52) U.S. Cl.
CPC ............ *G06F 2009/45583* (2013.01); *G06F 2009/45587* (2013.01); *G06F 2009/45591* (2013.01)

(56) References Cited

U.S. PATENT DOCUMENTS

| | | |
|---|---|---|
| 8,387,046 B1 | 2/2013 | Montague |
| 8,479,276 B1 | 7/2013 | Vaystikh |
| 8,479,286 B2 | 7/2013 | Dalcher et al. |
| 8,479,292 B1 | 7/2013 | Li et al. |
| 8,522,236 B2 | 8/2013 | Zimmer et al. |
| 8,775,715 B2 | 7/2014 | Tsirkin et al. |
| 8,832,352 B2 | 9/2014 | Tsirkin et al. |
| 8,839,245 B1 | 9/2014 | Khajuria et al. |
| 9,003,402 B1 | 4/2015 | Carbone et al. |
| 9,092,625 B1 | 7/2015 | Kashyap |
| 2003/0120856 A1 | 6/2003 | Neiger et al. |
| 2005/0216759 A1 | 9/2005 | Rothman et al. |
| 2006/0130060 A1 | 6/2006 | Anderson et al. |
| 2006/0248528 A1 | 11/2006 | Oney et al. |
| 2007/0174915 A1 | 7/2007 | Gribble et al. |
| 2007/0180454 A1 | 8/2007 | Fujimoto et al. |
| 2007/0300227 A1 | 12/2007 | Mall et al. |
| 2008/0028124 A1 | 1/2008 | Tago |
| 2008/0065854 A1 | 3/2008 | Schoenberg et al. |
| 2008/0244206 A1 | 10/2008 | Heo et al. |
| 2008/0294808 A1 | 11/2008 | Mahalingam et al. |
| 2009/0013149 A1* | 1/2009 | Uhlig .................... G06F 12/109 711/207 |
| 2009/0106754 A1 | 4/2009 | Liu et al. |
| 2009/0172661 A1 | 7/2009 | Zimmer et al. |
| 2010/0023810 A1 | 1/2010 | Stolfo et al. |
| 2010/0031360 A1 | 2/2010 | Seshadri et al. |
| 2010/0254622 A1 | 10/2010 | Kamay et al. |
| 2010/0299665 A1 | 11/2010 | Adams |
| 2011/0004935 A1 | 1/2011 | Moffie et al. |
| 2011/0047542 A1 | 2/2011 | Dang et al. |
| 2011/0047544 A1 | 2/2011 | Yehuda et al. |
| 2011/0153909 A1 | 6/2011 | Dong |
| 2011/0167422 A1 | 7/2011 | Eom et al. |
| 2011/0296412 A1 | 12/2011 | Banga et al. |
| 2011/0314546 A1 | 12/2011 | Aziz et al. |
| 2011/0320556 A1* | 12/2011 | Reuther ................. G06F 9/4856 709/213 |
| 2012/0047580 A1 | 2/2012 | Smith et al. |
| 2012/0254995 A1 | 10/2012 | Sallam |
| 2012/0255002 A1 | 10/2012 | Sallam |
| 2012/0255016 A1 | 10/2012 | Sallam |
| 2012/0255017 A1 | 10/2012 | Sallam |
| 2012/0255021 A1 | 10/2012 | Sallam |
| 2012/0311708 A1 | 12/2012 | Agarwal et al. |
| 2013/0031374 A1 | 1/2013 | Thom et al. |
| 2013/0055256 A1 | 2/2013 | Banga et al. |
| 2013/0145471 A1 | 6/2013 | Richard et al. |
| 2013/0191924 A1 | 6/2013 | Tedesco et al. |
| 2013/0174147 A1 | 7/2013 | Sahita et al. |
| 2013/0227680 A1 | 8/2013 | Pavlyushchik |
| 2013/0282776 A1 | 10/2013 | Durrant et al. |
| 2013/0283370 A1 | 10/2013 | Vipat |
| 2013/0305006 A1 | 11/2013 | Altman et al. |
| 2013/0312099 A1 | 11/2013 | Edwards |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0115652 A1 | 4/2014 | Kapoor |
| 2014/0351810 A1 | 11/2014 | Pratt |
| 2015/0199514 A1 | 7/2015 | Tosa |
| 2015/0199532 A1 | 7/2015 | Ismael |
| 2016/0132351 A1 | 5/2016 | Kashyap et al. |
| 2016/0306749 A1* | 10/2016 | Tsirkin .................. G06F 12/145 |
| 2017/0262306 A1* | 9/2017 | Wang ................... G06F 9/45558 |

FOREIGN PATENT DOCUMENTS

| | | |
|---|---|---|
| WO | WO-2012/177464 A1 | 12/2012 |
| WO | WO-2013/091221 A1 | 6/2013 |
| WO | WO-2014/004747 A2 | 1/2014 |

OTHER PUBLICATIONS

"Bromium vSentry—Defeat the Unknown Attack," Oct. 10, 2013, 11 pages.

Bromium Corp, "Bromium vSentry, Defeat of the Unknown Attack," downloaded from http://www.bromium.com/sites/default/files/Bromium-Whitepaper-vSentry_2.pdf on Dec. 1, 2013.

Bromium Corp, "Live Attack Visualization and Analysis, What does a Malware attack look like?" http://www.bromium.com/sites/default/files/Bromium%20LAVA%20WP_2.pdf on Dec. 1, 2013.

Chen, Peter M., and Brian D. Noble. "When virtual is better than real [operating system relocation to virtual machines]." Hot Topics in Operating Systems, 2001. Proceedings of the Eighth Workshop on. IEEE, 2001.

Gao, Debin, Michael K. Reiter, and Dawn Xiaodong Song. "On Gray-Box Program Tracking for Anomaly Detection." USENIX security symposium. 2004.

Garfinkel, Tal, and Mendel Rosenblum. "A Virtual Machine Introspection Based Architecture for Intrusion Detection." NDSS. 2003.

Gerzon, Gideon—"Intel® Virtualization Technology Processor Virtualization Extensions and Intel® Trusted execution Technology." (2007), 53 pages.

Heiser, Gernot, and Ben Leslie. "The OKL4 Microvisor: Convergence point of microkernels and hypervisors." Proceedings of the first ACM asia-pacific workshop on Workshop on systems. ACM, 2010.

Hofmeyr, Steven A., Stephanie Forrest, and Anil Somayaji. "Intrusion detection using sequences of system calls." Journal of computer security 6.3 (1998): 151-180.

Huang, Yih, et al. "Efficiently tracking application interactions using lightweight virtualization." Proceedings of the 1st ACM workshop on Virtual machine security. ACM, 2008.

Intel—"Intel 64 and IA-32 Architectures Software Developer's Manual, vol. 3B: System Programming Guide." Part 2, 2011, (Section 2.83, pp. 51-59), 1026 pages.

Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.

Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.

Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.

Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.

Kapravelos, Alexandros, et al. "Revolver: An Automated Approach to the Detection of Evasive Web-based Malware." USENIX Security Symposium. 2013.

King, Samuel T., and Peter M. Chen. "SubVirt: Implementing malware with virtual machines." Security and Privacy, 2006 IEEE Symposium on. IEEE, 2006, 14 Pages.

Kivity et al. "kvm: the Linux virtual machine monitor." Proceedings of the Linux symposium. vol. 1. 2007, 8 pages.

Kosoresow, Andrew P., and Steven A. Hofmeyr. "Intrusion detection via system call traces." IEEE software 14.5 (1997): 35-42.

Laureano, Marcos, Carlos Maziero, and Edgard Jamhour. "Intrusion detection in virtual machine environments." Euromicro Conference, 2004. Proceedings. 30th. IEEE, 2004.

(56) References Cited

OTHER PUBLICATIONS

Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09. Annual. IEEE, 2009.
Shah et al "Hardware-assisted Virtualization," 15-612 Operating System Practicum Carnegie Mellon University, Sep. 8, 2013, 28 pages.
Steinberg, Udo, and Bernhard Kauer. "NOVA: a microhypervisor-based secure virtualization architecture." Proceedings of the 5th European conference on Computer systems. ACM, 2010, 14 Pages.
Stumpf, Frederic, et al. "An approach to a trustworthy system architecture using virtualization." Autonomic and trusted computing. Springer Berlin Heidelberg, 2007. 191-202.
Sun, Kun, et al. "SecureSwitch: BIOS-Assisted Isolation and Switch between Trusted and Untrusted Commodity OSes." George Mason Feb. 26, 2013, 15 pages.
Wafaa, Andrew—"Introducing the 64-bit ARMv8 Architecture" Open Source Arm Ltd. EuroBSDCon conference, Malta, Sep. 28-29, 2013, 20 pages.
Wojtczuk, Rafal. "Subverting the Xen hypervisor." Black Hat USA 2008 (2008), pages.
Yan, Lok Kwong, et al. "Transparent and Extensible Malware Analysis by Combining Hardware Virtualization and Software Emulation." Internet Society, 2010. Downloaded from https://www.internetsociety.org/sites/default/files/05_1.pdf, 1 page.

\* cited by examiner

TECHNIQUE FOR IMPLEMENTING MEMORY VIEWS USING A LAYERED VIRTUALIZATION ARCHITECTURE

BACKGROUND

Technical Field

The present disclosure relates to virtualization architectures and, more specifically, to implementing memory views using a virtualization layer of a virtualization architecture.

Background Information

Data communication in a network involves the exchange of data between two or more entities interconnected by communication links and sub-networks (segments). The entities are typically software processes executing in operating systems of computers, such as endpoint nodes (endpoints) and intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers as well as operating system data structures. For example, malware content may be embedded within objects associated with a web page hosted by a malicious web site.

Various types of security enhanced nodes are routinely deployed at different segments of the networks. These nodes often employ virtualization systems to provide enhanced security needed to uncover the presence of malware embedded within ingress content propagating over the different segments. The enhanced security may include anti-virus scanning software that scans the ingress content for malware, as well as virtual machines that replay the content to monitor its behavior during execution so as to detect anomalies which may indicate the presence of malware. However, increasingly sophisticated malware may be able to infect the virtual machines and avoid detection by, e.g., altering states of resources of the nodes, such as operating system data structures. Moreover, strict specifications for some nodes (e.g., endpoints) may require execution of certain versions of software, despite known vulnerabilities and potential of infection by malware. Thus, it is desirable to protect the processes (as well as operating system data structures) executing in the virtual machines of the nodes while retaining malware detection capability.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein provide a technique for implementing memory views using a virtualization layer of a virtualization architecture executing on a node of a network environment. The virtualization layer may include a user mode portion having hyper-processes and a kernel portion having a micro-hypervisor (i.e., a type of hypervisor embodied as a micro-kernel operating at a highest privilege level of a physical processor of the node) that cooperate to virtualize a guest operating system kernel within a virtual machine (VM) of the node. The micro-hypervisor may further cooperate with the hyper-processes, such as a guest monitor, of the virtualization layer to implement one or more memory views of the VM. As used herein, a memory view is illustratively a hardware resource (i.e., a set of nested page tables for accessing memory of the node via a memory management unit) used as a container (i.e., to constrain access to the memory of the node) for one or more guest processes of the guest operating system kernel.

In an embodiment, a micro-VM may be implemented as a view of the memory (memory view) embodied as nested page table (NPT) address mappings that control a host-physical memory underlying a guest-physical view of the memory. Illustratively, an address space of each guest process may be represented by a combination of a guest page table (controlled by the guest operating system) and a memory view (e.g., NPT address mappings). Different guest processes may run in different memory views, each of which is controlled by the guest monitor associated with the VM to thereby enable a global view of execution activity in the guest operating system. Each memory view may have its own NPT hierarchy that describes the guest-physical memory layout of the view that may be particular to guest process (i.e., a micro-VM); accordingly, the VM may implement one or more micro-VMs as memory views through different NPTs of the NPT hierarchies. A protection profile associated with each guest process may be used to determine in which memory view (micro-VM) the respective guest process runs. The guest operating system kernel and hardware resources may then be mapped into the memory views.

In an embodiment, the VM may include a single, default memory view as an initial container for all guest processes of the guest operating system kernel. The guest monitor may thereafter create a new memory view when the default memory view is unsuitable for protection profile requirements of a guest process. Each guest process is illustratively bound to a memory view through a protection profile. The protection profile for a guest process may specify (i) an identifier of the guest process, (ii) types of process events to be intercepted by the virtualization layer (e.g., attempted execution of certain instructions or memory accesses), (iii) a reference (i.e., pointer) to a NPT hierarchy associated with (i.e., bound to) the guest process, i.e., the memory view in which the guest process runs, and (iv) access restrictions (e.g., embodied as permissions of the nested page tables of the NPT hierarchy) to be applied to memory pages when the process is active. Note that the guest process may be bound to the memory view based on a classification of the process. The classification may be rendered for the process (e.g., known good, thus no initial monitoring or unknown, thus undergo light, medium or heavy degree of monitoring) and used as a basis for establishing a policy associated with the process. The memory view may then be activated to constrain access to the memory while the guest process is active.

In an embodiment, a memory view may be mapped to a NPT hierarchy by the guest monitor. Upon observing the guest operating system switching to another (new) guest process, the guest monitor may instruct the micro-hypervisor to activate the memory view (i.e., switch to the NPT hierarchy) associated with the other (new) guest process. A policy decision may be subsequently rendered to move the guest process into a separate memory view having a protection profile to enable exploit detection monitoring of the process (e.g., enhanced event interception and tightened memory access restrictions). For example, the guest process may be created to run with more restrictive memory protection than that provided by the default memory view. Accordingly, the guest monitor may cooperate with a threat protection component of the virtualization layer to instruct the micro-hypervisor to create a new memory view. Based on certain monitoring criteria for exploit detection, the threat protection component may instruct the guest monitor to migrate (e.g., move) the guest process to a more restrictive memory view. The guest process may then undergo scrutiny (e.g., instrumentation and monitoring) within the restrictive memory view, wherein certain memory pages may be write protected, execute protected or read protected. The virtualization layer can observe the behavior of the guest process and if such monitoring indicates that the guest process is not malicious, the threat protection component may decide to move the process back to the less restrictive (e.g., default) memory view.

Advantageously, the assignment of guest processes to memory views (micro-VMs) is flexible and efficient. For example, guest processes that belong to a particular (default) protection profile may run in a memory view where the entire memory is visible (accessible), e.g., in guest mode, and no access permissions have been overridden. Certain other guest processes may require a higher degree of protection/monitoring and may be assigned to a memory view where the guest monitor may tighten (i.e., restrict) access permission to certain memory pages. Likewise, certain trusted processes may be assigned to a memory view where certain memory pages are visible (i.e., accessible) that are not visible in the other memory views. In sum, one or more guest processes may be assigned to each memory view and a guest process may also be reassigned from one memory view to another according to the protection profile associated with that guest process.

DESCRIPTION

Figure 1:
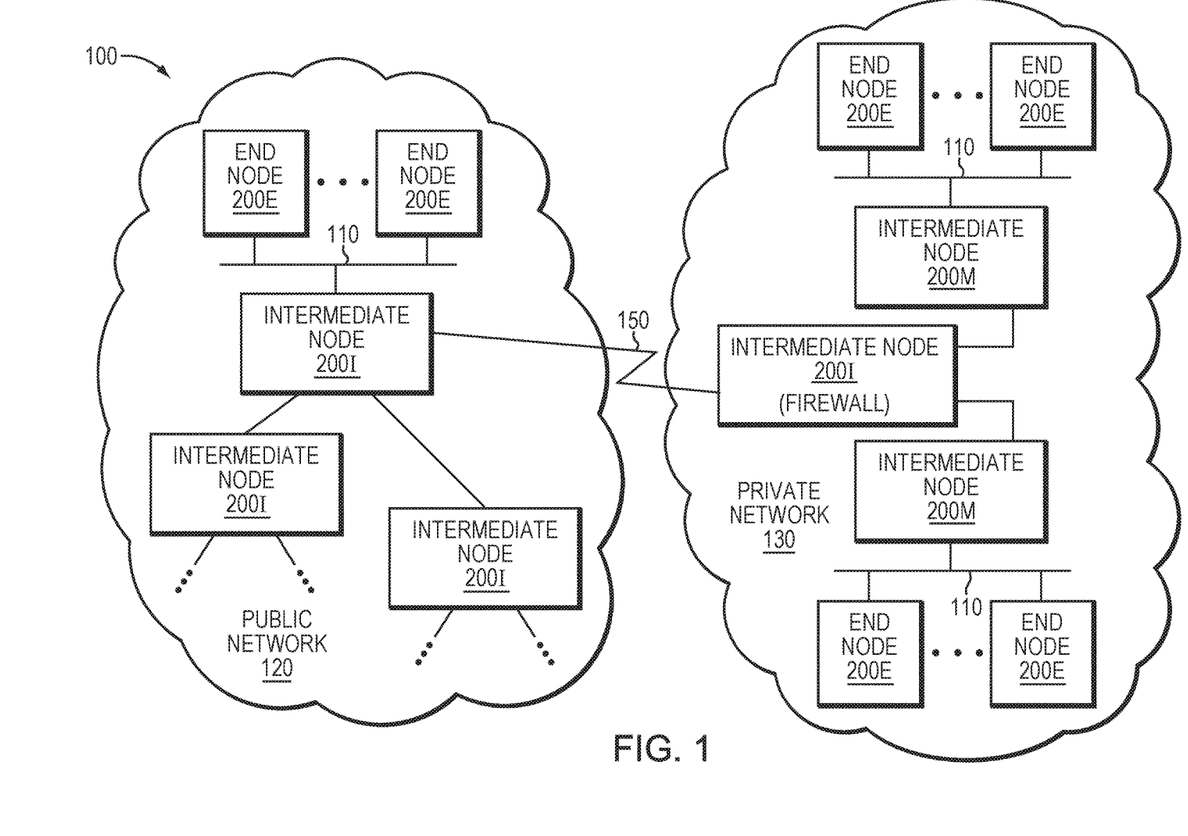
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of computer networks organized as a public network 120, such as the Internet, and a private network 130, such as an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that additional protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
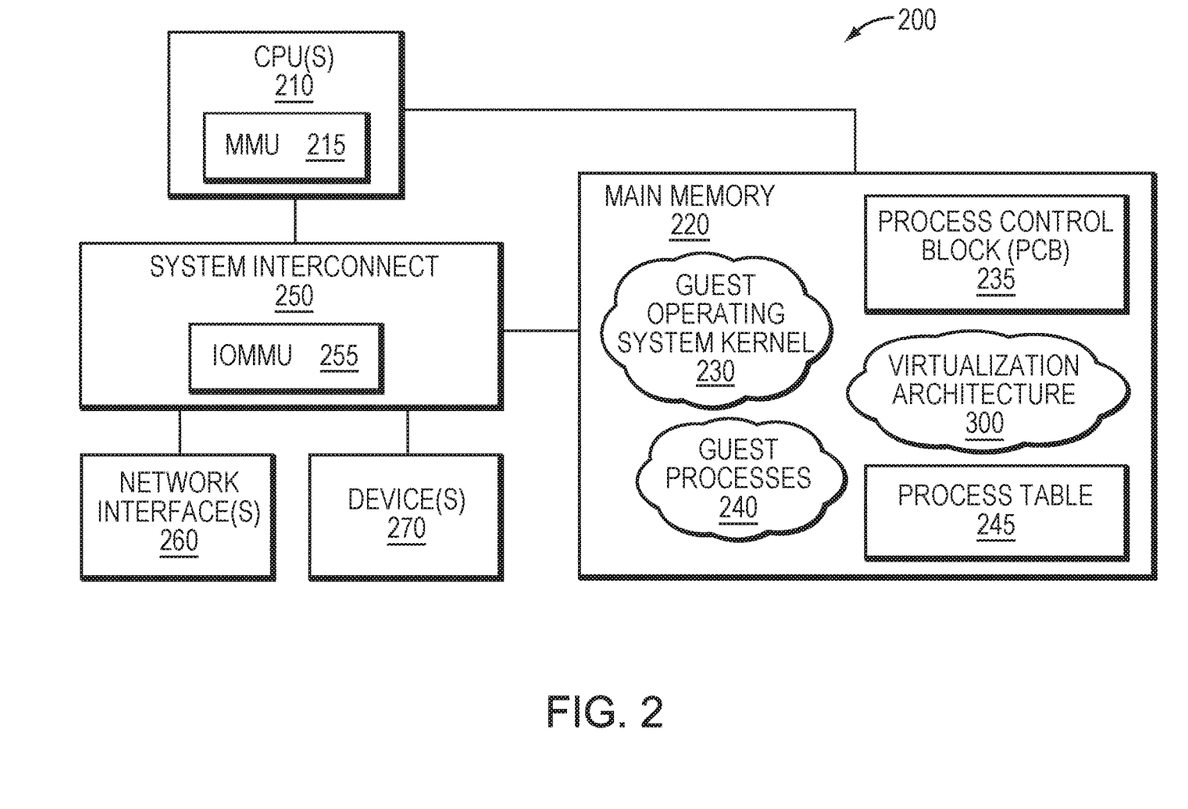
FIG. 2 is a block diagram of a node that may be advantageously used with one or more embodiments described herein.

FIG. 2 is a block diagram of a node 200, e.g., end node $200_E$ or MDS appliance $200_M$, which may be advantageously used with one or more embodiments described herein. The node 200 illustratively includes one or more central processing unit (CPUs) 210 each having one or more CPU cores (not shown), a main memory 220, one or more network interfaces 260 and one or more devices 270 connected by a system interconnect 250. The devices 270 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 260 may include one or more network ports containing the mechanical, electrical and/or signaling circuitry needed to connect the node to the network 130 to thereby facilitate communication over the network. To that end, the network interface 260 may be configured to transmit and/or receive messages using a variety of communication protocols including, inter alia, TCP/IP and HTTPS.

The memory 220 may include a plurality of locations that are addressable by the CPU(s) 210 via a memory management unit (MMU 215), as well as the network interface(s) 260 and device(s) 270 via an I/O MMU (IOMMU 255). Note that accesses to/from memory 220 by the CPU(s) 210 may occur directly through the MMU 215 without passing through the system interconnect 250, whereas accesses to/from the memory by the network interface(s) 260 and device(s) 270 may occur directly through the IOMMU 255 of the system interconnect. That is, a first data path may occur directly from the CPU to the memory 220 and a second (independent) data path may occur directly from the I/O devices 270 to the memory 220 via the system interconnect 270. The memory locations may be configured to store software program code (e.g., an operating system and application programs) and data structures associated with the embodiments described herein. The CPU 210 may include processing elements or logic adapted to execute the software program code, such as modules of a virtualization architecture 300, and manipulate the data structures, such as a process table 245. Exemplary CPUs may include families of instruction set architectures based on the x86 CPU, the x64 CPU, and the ARM CPU.

A (guest) operating system kernel 230, portions of which are typically resident in memory 220 and executed by the CPU, functionally organizes the node by, inter alia, invoking operations in support of the software program code and application programs executing on the node. A suitable guest operating system kernel 230 may include the Windows® series of operating systems, the MAC OS® series of operating systems, the Linux operating system and versions of the Android™ operating system, among others. Suitable application programs may include Adobe Reader® and Microsoft Word. Illustratively, the software program code may be executed as guest processes 240 of the kernel 230. As used herein, a process (e.g., a guest process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer applications or programs stored in memory, alternative embodiments may also include the code, processes and programs being embodied as components, logic, and/or modules consisting of hardware, software, firmware, or combinations thereof.

Virtualization Architecture

Figure 3:
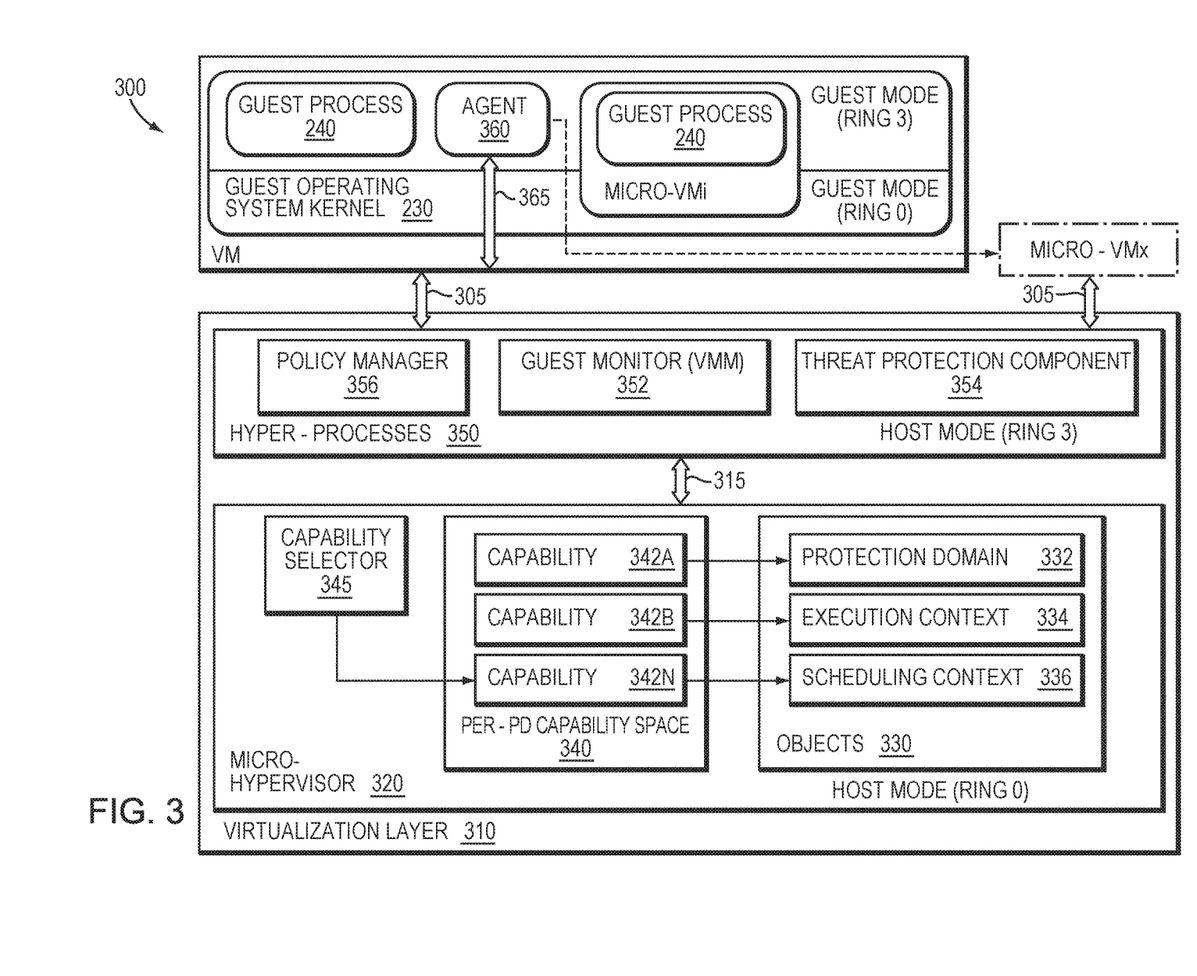
FIG. 3 is a block diagram of a virtualization architecture including a virtualization layer that may be advantageously used with one or more embodiments described herein.

FIG. 3 is a block diagram of a virtualization architecture 300 including a virtualization layer 310 that may be advantageously used with one or more embodiments described herein. The virtualization architecture 300 described herein is illustratively deployed in node 200 embodied as endpoint $200_E$ although the architecture may be further extended for deployment in an appliance, such as MDS appliance $200_M$. The virtualization architecture 300 illustratively includes two privilege modes: guest mode and host mode. In an embodiment, a guest operating system (O/S) runs in the guest mode within a virtual machine, e.g., VM. The guest mode may employ a first set of four protection rings, e.g., guest mode rings 0-3, wherein one or more guest applications (guest processes 240) run in guest mode ring 3 at a lowest guest mode privilege level, and the guest operating system (guest operating system kernel 230) runs in guest mode ring 0 at a highest guest mode privilege level. The virtualization layer 310 operates in host mode of the virtualization architecture, which includes a second set of four protection rings, e.g., host mode rings 0-3. Illustratively, various user mode components embodied as hyper-processes 350 of the virtualization layer 310 run in host mode ring 3 at a lowest host mode privilege level, and a kernel portion (i.e., micro-hypervisor 320) of the virtualization layer runs in host mode ring 0 at a highest host mode privilege level.

The micro-hypervisor 320 (i.e., a type of hypervisor operating at a highest privilege level of a physical processor of the node) may be embodied as a light-weight module (e.g., a micro-kernel) configured to facilitate run-time security analysis, including exploit and malware detection and threat intelligence, of the guest processes 240 executing on the node 200. As described herein, the micro-hypervisor 320 may cooperate with corresponding hyper-processes 350 of the virtualization layer 310 to virtualize the hardware and control privileges (i.e., access control permissions) to hardware resources of the node that are typically controlled by the guest operating system kernel. Illustratively, the hardware resources may include (physical) CPU(s) 210, memory 220, network interface(s) 260, and devices 270. The micro-hypervisor 320 may be configured to control access to one or more of the resources in response to a request by a guest process 240 to access the resource.

A user mode portion of the virtualization layer 310 includes the hyper-processes 350, examples of which include, inter alia, a guest monitor 352, a threat protection component 354, and a policy manager 356. The guest monitor 352 is illustratively a unique virtual machine monitor (VMM), i.e., a type 0 VMM, which includes virtualization functionality that cooperates with the micro-hypervisor 320 to virtualize the guest operating system within the VM and run one or more micro-virtual machines (micro-VMs), such as, in some embodiments, a memory view (as described below). Accordingly, the guest monitor 352 may include computer executable instructions executed by the CPU 210 to perform operations that spawn, configure, and control/implement the VM or any of a plurality of micro-VMs. The guest monitor 352 may further include virtualization functionality that emulates privileged instructions (i.e., an instruction emulator) and devices (i.e., a virtual device emulator) that act as software substitutes for hardware devices not directly assigned to the guest operating system. As such, a set of hardware resources may be virtualized among a plurality of micro-VMs that may access those resources. That is, the guest monitor 352 may create virtual devices (e.g., software state machines) of the hardware resources for use by the micro-VMs that, from the perspective of the guest operating system, appear as physical resources.

As used herein, the term "micro" VM denotes a virtual machine serving as a container that may be restricted to a single guest process (as opposed to the VM which is spawned as a container for the entire guest operating system having many guest processes). In one embodiment, the micro-VMx may be implemented outside of the VM, (i.e., in a separate protection domain) using, e.g., copy-on-write semantics. In another embodiment, the micro-VMi may be implemented inside the VM (i.e., inside a same protection domain as the VM) using, e.g., one or more memory views as described further herein. However, whereas a micro-VM may be restricted to a single guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory, corresponding to one nested page table. Accordingly, as described herein, a same nested page table (i.e., memory view) may be used by a plurality of guest processes, each contained in a separate corresponding micro-VM that uses a same nested page table. However, additional views of memory may be created for each guest process, such as where every view corresponds to a different (i.e., separate) nested page table. Thus, different guest processes may view the guest-physical memory differently (e.g., with different translations or different permissions to the host-physical memory).

In an embodiment, the micro-VM may be implemented as such a view (i.e., a guest-physical memory view) of the memory 220, i.e., controlling the host-physical memory (hardware resource) underlying the guest-physical view of memory. Notably, different guest processes 240 may run in different micro-VMs, each of which is controlled by the (same) guest monitor 352 (also controlling the VM) to thereby enable a global view of execution activity in the guest operating system. The micro-VM thus has properties similar to the typical VM, but with less overhead, i.e., no additional guest monitors. In terms of execution, operation of the guest process is controlled (e.g., synchronized) by the guest operating system kernel 230; however, in terms of access to hardware resources (managed in host mode), operation of the process is controlled by the guest monitor 352. Access to hardware resources may be controlled among the micro-VMs and the VM by the guest monitor 352 rather than virtually shared. Notably, certain types of hardware resources, such as memory, may not need express control among micro-VMs. For example, each CPU core may have a single memory view (i.e., set of nested page tables) active at a time, so that express control among memory views is unnecessary. As such, memory views may be assigned to multiple micro-VMs with implicit control.

In an embodiment, the privileged interfaces 305 and 315 may be embodied as a set of defined hyper-calls, each of which is an operation that explicitly calls (explicit transition) into the micro-hypervisor. The hyper-calls may originate from one or more hyper-processes 350 of the virtualization layer 310 and are directed to the micro-hypervisor 320 over the privileged interface 315; alternatively, bi-directional communications may originate from a protected component (e.g., an agent) in the guest operating system directed to the micro-hypervisor (virtualization layer) over the privileged interface 305. A transition from the guest operating system to the virtualization layer 310 is called a VM exit. Such a transition may be implicit, e.g., an intercepted operation or page-protection violation, or explicit, such as a VMCALL instruction from guest mode to host mode. Further, as used herein, an inter-process communication (IPC) message between two hyper-processes requires two hyper-calls (i.e., one for each process) for bi-directional communication.

The policy manager 356 may contain computer executable instructions executed by the CPU 210 to perform operations that associate a protection policy with each guest process 240, as described further herein. The threat protection component 354 may include instrumentation logic implemented as heuristics configured to determine the presence of an exploit or malware in any suspicious guest operating system process (kernel or user mode). To that end, the threat protection component 354 may include software program code (e.g., executable machine code) in the form of instrumentation logic (including decision logic) configured to analyze one or more interception points originated by one or more guest processes 240 to invoke the services, e.g., accesses to the hardware resources, of the guest operating system kernel 230. Illustratively, the threat protection component 354 may contain computer executable instructions executed by the CPU 210 to perform operations that initialize and implement the instrumentation logic.

As used herein, an interception point is a point in an instruction stream where control passes to (e.g., is intercepted by) the virtualization layer 310, e.g., the micro-hypervisor 320. Illustratively, the micro-hypervisor can intercept execution inside the guest operating system at arbitrary points such as (i) inside any guest process, (ii) inside the guest operating system kernel, and/or (iii) on transitions between guest processes and the guest operating system kernel. Malicious behavior may then be analyzed by the virtualization layer (e.g., the threat protection component 354), wherein the behavior may occur anywhere in the guest operating system, including in any guest process or in the guest operating system kernel. The virtualization layer 310 may, thus, place interception points at appropriate instruction stream points, whether in a process or in the kernel.

The guest operating system kernel 230 may be configured to include an operating system (OS) specific extension or agent 360 adapted to communicate with the threat protection component 354. The agent 360 illustratively contains executable machine code in the form of logic configured to provide an interface to the threat protection component 354 that allows introspection (examination and/or interception) of contents of internal structures of the guest operating system kernel 230, as well as semantic context associated with such contents. Such virtual machine introspection (VMI) may involve examination of data structures of the guest operating system kernel 230 in a manner that obviates duplication of (i.e., without copying) those structures between the guest and host modes of the virtualization architecture. To that end, the agent 360 may run in host mode ring 3 or guest mode ring 0; however, in an embodiment described herein, the agent 360 illustratively runs in guest mode ring 3. Accordingly, the agent 360 may contain computer executable instructions executed by the CPU 210 to perform operations that implement communication with, and introspection by, the threat protection component 354. For example, identification (ID) of each guest process 240 running in the guest operating system may be obtained from process IDs stored in a data structure, e.g., the process table 245, of the guest operating system. Instead of having to know a location and format of that data structure, the threat protection component 354 can instruct the agent to examine the process table 245 and provide the ID of the guest process 240. That is, the agent 360 operating in the guest mode may act on behalf callers (e.g., guest monitor 352) operating in the host mode to access data structures in the guest mode. Alternatively, the threat protection component may examine directly the memory used by the guest O/S (i.e., virtual machine introspection) to determine locations (and layout) of the process table 245 so as to determine the ID of the guest process 240. Illustratively, threat protection component 354 may communicate with the guest operating system (i.e., the agent 360) over a defined application programming interface (API) 365.

As a light-weight module, the micro-hypervisor 320 may provide a virtualization layer having less functionality than a typical hypervisor. Therefore, as used herein, the micro-hypervisor 320 is a module that is disposed or layered beneath (underlying, i.e., directly on native hardware and operating at a highest privilege level of that native hardware) the guest operating system kernel 230 and includes the functionality of a micro-kernel (e.g., protection domains, execution contexts, capabilities and scheduling), as well as a subset of the functionality of a hypervisor (e.g., management of virtual CPUs and their states, management of the MMU, IOMMU and other security-critical devices, as well as hyper-calls to implement a virtual machine monitor). Accordingly, the micro-hypervisor 320 may cooperate with the guest monitor 352 to provide additional virtualization functionality in an operationally and resource efficient manner. Unlike a type 1 or type 2 VMM (hypervisor), the guest monitor 352 is illustratively a type 0 VMM (VMM) that does not fully virtualize the hardware resources of the node 200, while supporting execution of one entire operating system/instance inside one virtual machine, i.e., the VM. Illustratively, the VMM may either: (i) fully virtualize all hardware resources, (ii) virtualize only a first group of security-critical devices (e.g., CPU, MMU, IOMMU and interrupt controllers among others) and pass-through a remaining second group of non-security-critical devices; or (iii) virtualize a first group of devices and pass-through a second group of devices that are each assigned to a different VM. The guest monitor 352 may thus instantiate the VM as a container for the guest processes 240, as well as the guest operating system kernel 230 and its hardware resources. Illustratively, the guest monitor 352 is a pass-through module configured to expose the hardware resources of the node (as controlled by micro-hypervisor) to the guest operating system kernel 230. Yet, virtualization processing in response to a VM exit (and a resulting transition of control flow from the guest operating system to the micro-hypervisor) may be performed by the guest monitor. To that end, the micro-hypervisor 320 may enable communication between the guest operating system (i.e., the VM) and the guest monitor over privileged interfaces 305 and 315.

In an embodiment, the micro-hypervisor 320 may include a plurality of data structures, such as objects 330 and capabilities 342, configured to provide security and isolation features associated with the virtualization architecture 300. Illustratively, the objects 330 include one or more protection domains 332, execution contexts 334 and scheduling contexts 336. As used herein, a protection domain 332 is a kernel mode object that implements spatial isolation among the hyper-processes of the virtualization layer and includes a representation of a security privilege associated with each hyper-process 350 that is enforced by the micro-hypervisor 320. Illustratively, each hyper-process 350 in the virtualization layer 310 runs in a separate protection domain 332. An execution context 334 is illustratively a representation of a thread associated with the hyper-process 350 and, to that end, defines a state of the thread for execution on the CPU 210. In an embodiment, the execution context 334 may include inter alia (i) contents of CPU registers, (ii) pointers/values on a stack, (iii) a program counter, and/or (iv) allocation of memory via, e.g., memory pages. The execution context 334 is thus a static view of the state of thread and, therefore, its associated hyper-process 350. For the thread to execute on a CPU, its execution context is tightly linked to a scheduling context 336, which may be configured to provide information for scheduling the execution context 334 for execution on the CPU 210. Illustratively, the scheduling context information may include a priority and a quantum time for execution of its linked execution context on CPU 210.

The micro-hypervisor 320 also includes a per-protection domain (PD) capability space 340 that contains capabilities 342A-N, wherein each capability 342 is a pointer to an object 330 having associated permissions (i.e., privileges). Hyper-processes 350 of the virtualization layer 310 do not have the ability to work with the capabilities 342 directly, i.e., they cannot read the pointer or privileges directly and can only refer to those capabilities using a capability selector 345, e.g., an integral number. To invoke a specific capability, a hyper-process 350, such as the guest monitor 352, may issue a hyper-call request (e.g., over interface 315) to the micro-hypervisor 320, wherein the request includes an action (e.g., "send a message" or "delegate a capability") along with a corresponding capability selector, i.e., an index such as N, that identifies (names) the object 330 involved in the hyper-call. Illustratively, the capabilities 342 are used to name the object on which the hyper-call operates and, at the same time, convey the access permissions of the calling hyper-process on that object. In response to the request, the micro-hypervisor may access the per-PD capability space 340 to select the requested capability 342N, which names (e.g., points to) the object (e.g., scheduling context 336) on which the action is performed.

Illustratively, a capability 342 is a concept that is only known in the virtualization layer 310, i.e., the guest operating system is unaware of the capability. The capability 342 is essentially a mechanism to enforce security privileges among the hyper-processes 350 of the virtualization layer 310. Notably, each hyper-process 350 is provided only a minimal set of capabilities 342 necessary for that component to perform its assigned function. For example, the guest monitor 352 may have the capability to access the VM, while only the threat protection component 354 may have the capability to communicate with the guest monitor 352 and policy manager 356. Thus, an attacker that is able to compromise a hyper-process (protection domain 332) would only be able to inflict damage associated with the capabilities 342 held by that protection domain 332.

As described herein, certain events or activities, e.g., attempted access to hardware resources, of a guest process 240 may be treated as interception points that allow the virtualization layer 310 to further monitor or instrument the process using a spawned micro-VM. A system call is an example of an interception point at which a change in privilege modes or levels occurs in the guest operating system, i.e., from guest mode ring 3 (a lowest level of guest mode privilege) of the guest process 240 to guest mode ring 0 (a highest mode of guest mode privilege) of the guest operating system kernel 230. The guest monitor 352 may intercept the system call and examine a state of the process issuing (sending) the call. The instrumentation logic of threat protection component 354 may analyze the system call to determine whether the call is suspicious and, if so, instruct the guest monitor 352 to instantiate (spawn) one or more micro-VMs, managed by the guest monitor in cooperation with the threat protection component, to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Memory Virtualization

Figure 4:
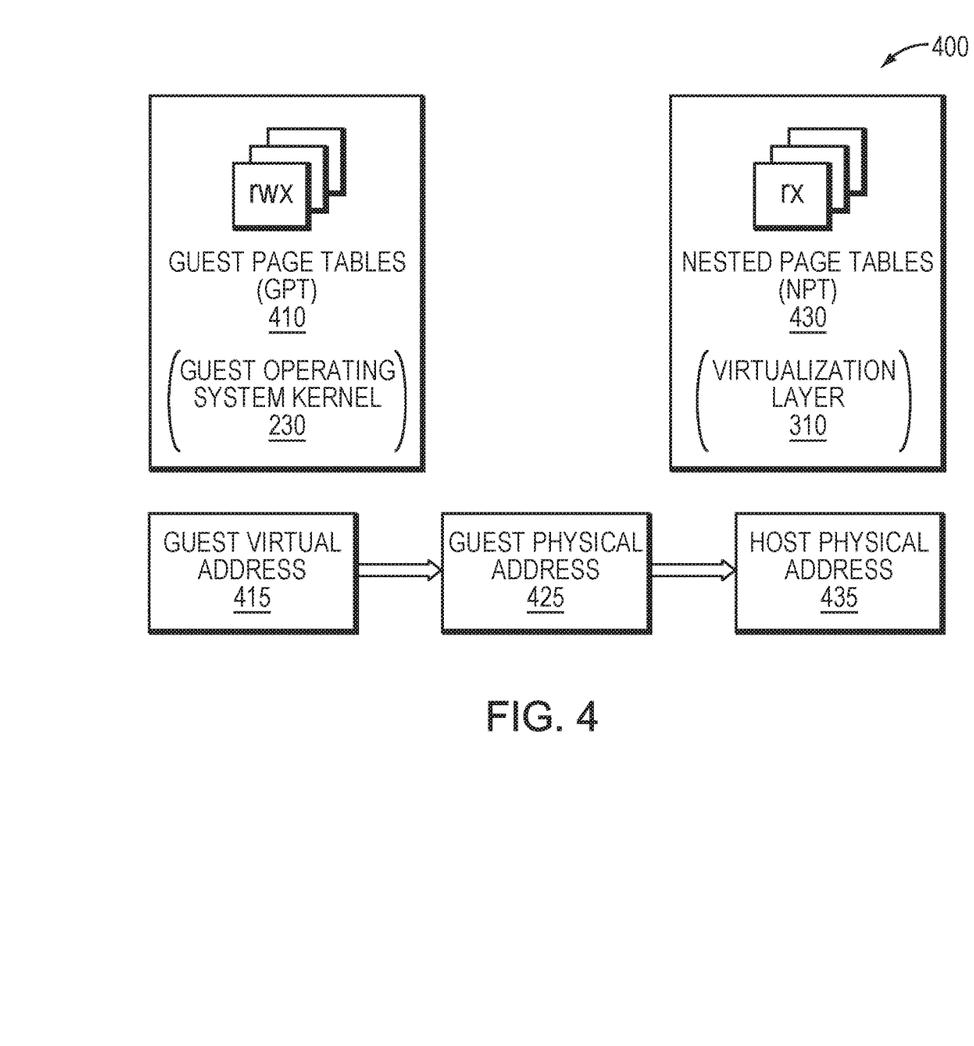
FIG. 4 is a block diagram illustrating memory virtualization that may be advantageously used with one or more embodiments described herein.

FIG. 4 is a block diagram illustrating memory virtualization 400 that may be advantageously used with one or more embodiments described herein. The guest operating system kernel 230 may create one or more sets of guest page tables (GPT) 410, wherein there is typically one set of guest page tables per guest process 240 that perform a first translation from a guest virtual (linear) address 415 to a guest-physical address 425. Each guest process 240 typically runs in its own address space of guest-virtual addresses; to that end, the guest operating system kernel 230 creates one or more guest page tables 410, e.g., in the form of a guest page table hierarchy, associated with the address space of the guest process 240. When switching guest processes for execution on the CPU 210 during a context switch, the guest operating system kernel 230 swaps a prior guest page table hierarchy (of a prior process) for the guest page table hierarchy of the (current) process to be executed.

Virtualization provides one or more additional page tables, i.e., nested page tables (NPT) 430, layered underneath (i.e., nested with) the GPT 410. The nested page tables 430 may be utilized to perform a second translation from the guest-physical address 425 to a host-physical address 435, wherein the host-physical address 435 is an address used to access (physical) main memory 220. The translation of guest-physical address 425 to host-physical address 435 may be flexible, i.e., such translation may be implemented on a per page basis to determine how each guest-physical address 425 is translated to a host-physical address 435. Illustratively, translation from guest-physical addresses to host-physical addresses is controlled by the virtualization layer 310 to establish a mapping from the guest-physical addresses used in a VM (e.g., the VM) to a host-physical address in main memory 220.

In an embodiment, guest page tables 410 are part of a guest page table hierarchy that is controlled by the guest operating system kernel 230, and the nested page tables 430 are part of a nested page table hierarchy that is controlled by the virtualization layer 310, e.g., managed by the micro-hypervisor 320 in cooperation with the guest monitor 352. In one arrangement where the MMU hardware supports nested paging, the page table hierarchies may be organized as a two-stage (i.e., layered) translation arrangement of the (physical) MMU 215 (supporting a virtualized MMU via two-level page table hierarchies), where the page tables define the translation of a guest-virtual address 415 to a guest-physical address 425 (a first stage defined by the GPT) and, ultimately, to a host-physical address 435 (a second stage defined by the NPT). There, the guest operating system kernel 230 manages the guest page tables 410, the virtualization layer 310 manages the nested page tables 430, and the nested page tables are consulted by the MMU after the guest page tables. Hence, the nested page tables may be used to override permissions.

In an alternative arrangement where the MMU hardware does not support nested paging (e.g., it can only perform one-level translation), the guest page tables may be organized as a shadow page table arrangement synchronized with the nested page table hierarchy such that the shadow page tables provide guest-virtual address to host-physical address translations that are updated with changes to the guest page table hierarchy or nested page table hierarchy. The virtualization layer 310 is responsible for folding the guest page tables 410 (managed by the guest operating system kernel 230) and the nested page tables 430 (managed by the virtualization layer) together to create the shadow page tables so as to perform end-to-end translation from guest-virtual addresses to host-physical addresses. The MMU 215 then uses the shadow page tables for translating guest-virtual addresses to host-physical addresses as a single level translation. Accordingly, the shadow page tables are updated when the guest page tables or nested page tables change. It should be noted that either arrangement may provide additional functionality, wherein each translation stage may define access permissions on a page granularity. That is, for each page referenced by a page table, access permissions may be specified as to whether the page is readable (r) writeable (w), or executable (x).

In an embodiment, the "ultra" (ultimate) translation to physical memory of the two-stage arrangement, i.e., the translation from guest-physical address 425 to host-physical address 435, may be employed to overwrite any page permissions that the guest operating system kernel 230 has defined. For example, assume the guest operating system kernel 230 has defined, using the GPT, a certain read (r), write (w), execute (x) mapping for a guest-virtual address 415 to guest-physical address 425 of a page accessible by a guest process 240, so that the guest process 240 may expect that it can actually read, write and execute that page. Yet, using the nested page tables 430 (i.e., layered beneath the GPT), the virtualization layer 310 may alter or change those permissions to be write protected, i.e., read-only (r) and execute (x) with no write permission, for the actual (host) physical page that the guest operating system kernel 230 (and guest process 240) may attempt to access. Therefore, any time that the guest process 240 attempts a write access to the page, an access violation of the nested page tables occurs, resulting in a VM exit (e.g., a transition) that returns control to the virtualization layer 310. Note that for the shadow page table arrangement, the violation occurs for a shadow page acting as a condensed two-stage address translation. In response to determining that the attempted write access is to a physical page that is write protected, the virtualization layer 310 may take action, such as emulating the access, making the page writeable, shadow copying the write, or completely nullifying the effects of that access. As another example, assume the guest operating system kernel 230 has marked the page as non-executable. The virtualization layer 310 may render the page executable or emulate the instruction that would have been executed if the page had been executed.

Memory Views

The embodiments described herein provide a technique for implementing memory views using the virtualization layer. As noted, the micro-hypervisor may cooperate with one or more hyper-processes of the virtualization layer 310 to determine the presence of an exploit or malware in any suspicious guest operating system process (kernel or user mode). To that end, the micro-hypervisor 320 may further cooperate with the hyper-processes, such as a guest monitor, of the virtualization layer to implement one or more memory views of the virtual machine (VM) to, e.g., constrain access to hardware resources, such as memory, by the guest process. In an embodiment, the micro-VM may be implemented as a view of the memory 220 (memory view) embodied as nested page table address mappings that control the host-physical memory underlying the guest-physical view of memory. Accordingly, the memory view is a hardware resource (i.e., a set of NPT tables for accessing the memory via the MMU) used by the micro-VM as a container (i.e., constraining access to the memory) for one or more guest processes.

Illustratively, an address space of each guest process 240 may be represented by the combination of the GPT and a memory view (e.g., NPT address mappings). Different guest processes 240 may run in different memory views, each of which is controlled by the guest monitor 352 associated with the VM to thereby enable a global view of execution activity in the guest operating system. In an embodiment, each memory view may have its own nested page table hierarchy that describes the guest-physical memory layout of the view (i.e., micro-VM); accordingly, the VM may implement one or more micro-VMs as memory views through different NPTs 430 of the nested page table hierarchies. A protection profile of each guest process, as described further herein, defines in which memory view (micro-VM) that guest process runs. The guest operating system kernel 230 and hardware resources may then be mapped into the memory views.

Figure 5:
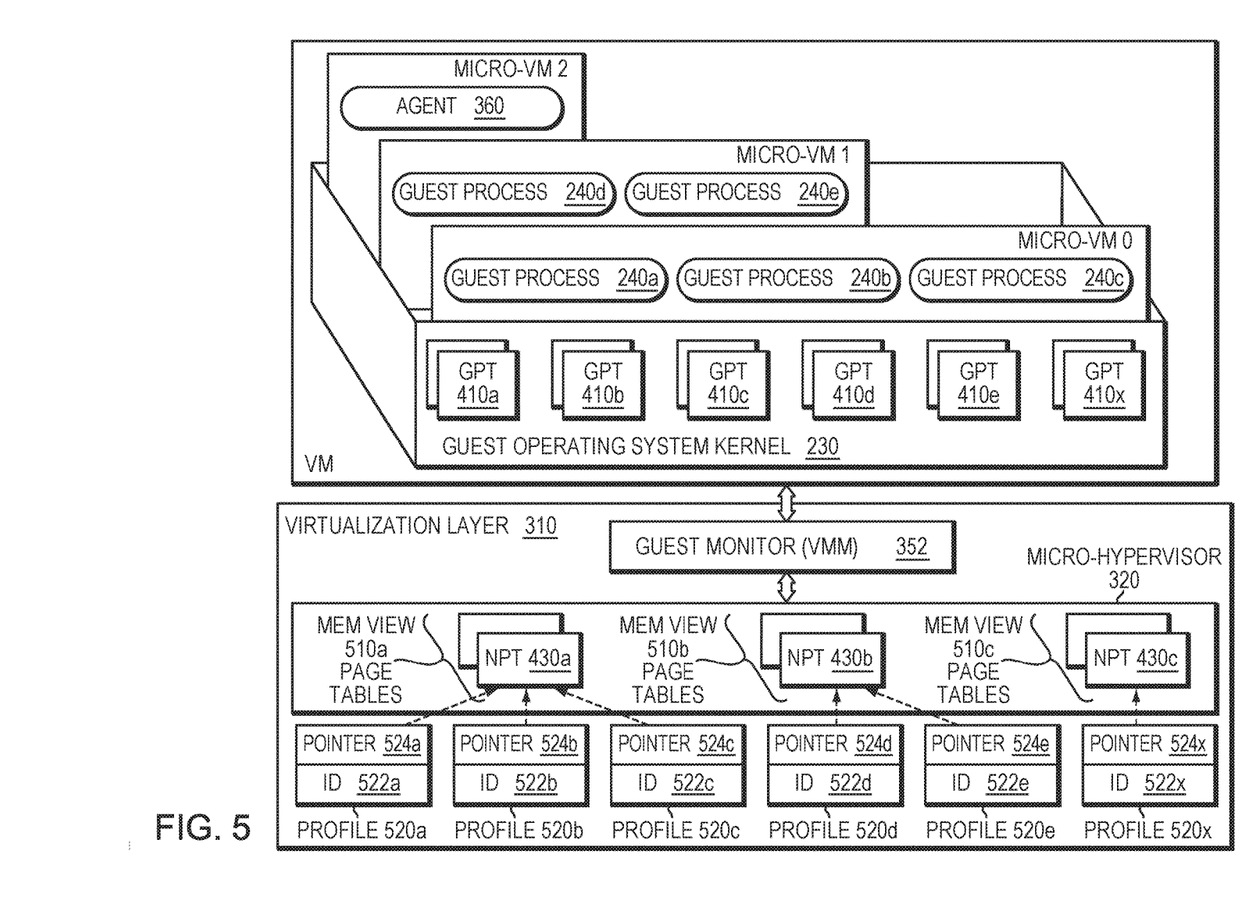
FIG. 5 is a block diagram illustrating one or more memory views that may be advantageously used with one or more embodiments described herein.

FIG. 5 is a block diagram illustrating one or more memory views that may be advantageously used with one or more embodiments described herein. In an embodiment, each guest process 240 runs in a micro-VM that encompasses an address space associated with a set of GPTs 410 of a guest page table hierarchy as controlled by the guest operating system kernel 230. For example, guest processes 240a,b,c run in micro-VM 0, wherein each guest process 240a,b,c has an address space associated with GPTs 410a,b,c, respectively. Similarly, guest processes 240d,e run in micro-VM 1, wherein each guest process 240d,e has an address space associated with GPTs 410d,e, respectively, and agent 360 runs in a micro-VM 2 having an address space associated with GPTs 410x. Moreover, each micro-VM may be implemented in the micro-hypervisor as a memory view 510 having an associated nested page table hierarchy.

Illustratively, each memory view 510 has its own set of NPTs 430 of a nested page table hierarchy associated with a micro-VM that describes the guest-physical memory layout of that view as controlled by the virtualization layer 310, e.g., managed by micro-hypervisor 320 in cooperation with the guest monitor 352. For example, memory view 510a has NPTs 430a associated with micro-VM 0, memory view 510b has NPTs 430b associated with micro-VM 1, and memory view 510c has NPTs 430c associated with micro-VM 2. As such, the VM may include one or more micro-VMs each having different nested page table hierarchies. Accordingly, one or more guest processes 240 along with the guest operating system kernel 230 run in a micro-VM, i.e., guest processes 240a,b,c and guest O/S kernel 230 run in micro-VM 0, guest processes 240d,e and guest O/S kernel 230 run in micro-VM 1, and agent 360 and guest O/S kernel 230 run in micro-VM 2.

When the guest operating system kernel 230 switches from one guest process 240 to another, the guest monitor 352 (VMM) observes the guest process switch and, in response, instructs the micro-hypervisor to swap (switch) to the NPT 430 that implements the memory view to which the switched process is assigned. Thus, if the guest monitor 352 observes a guest process switch from guest process 240a to guest process 240c (or from guest process 240d to guest process 240e), no NPT switching occurs and the memory view remains unchanged. However, in response to observing a guest process switch from guest process 240c to guest process 240e, the guest monitor 352 (in cooperation with the micro-hypervisor) switches from NPT 430a to NPT 430b. Likewise, in response to observing a switch from guest process 240d to the agent 360, the guest monitor switches from NPT 430b to NPT 430c. Because the guest operating system kernel 230 is mapped in all nested page table hierarchies, a change from one memory view (micro-VM) to another does not change the state of the guest operating system kernel, i.e., it appears as if the guest operating system kernel 230 "moves" from one memory view to another.

In an embodiment, the VM includes a single, default memory view as an initial container for all guest processes 240 of the guest operating system kernel 230. For example, the guest processes may be initially assigned to, e.g., default memory view 510a. The guest monitor may thereafter create a new memory view if the default memory view is unsuitable for protection profile requirements of a guest process. Illustratively, each guest process is bound to (associated with) a memory view through a protection profile 520a-x. The protection profile for a guest process may specify (i) an identifier of the guest process 522a-x; (ii) types of process events to be intercepted by the virtualization layer (e.g., attempted execution of certain instructions or memory accesses) (not shown), (iii) a reference (i.e., pointer) 524a-x to a NPT hierarchy associated with the guest process, i.e., the memory view in which the guest process runs (and to which the guest process is bound), and (iv) access restrictions (e.g., embodied as permissions of the nested page tables of the NPT hierarchy) (not shown) to be applied to memory pages when the process is active. Two or more guest processes having the same protection profile may share the same memory view (micro-VM); otherwise a new memory view may be created for one or more of the processes.

Assume the guest operating system kernel creates a new guest process 240. The virtualization layer may determine the identity of the guest process by, inter alia, employing the agent 360 to probe the guest process and communicate with the virtualization layer 310 (i.e., the threat protection component 354) regarding location and semantics of certain guest operating system data structures. For example, when the new guest process is created in the guest operating system, the agent 360 may identify the process to the virtualization layer via activation of a guest page table hierarchy (e.g., setting a root pointer to the guest page table hierarchy in the MMU). Illustratively, the agent may examine the process table 245 to acquire the identity of the new guest process 240 and then inform the virtualization layer 310 that a corresponding value of a virtual control register that points to the guest page table hierarchy belongs to the new guest process 240, as described in co-pending U.S. patent application Ser. No. 15/230,215 filed Aug. 5, 2016, titled, Technique for Protecting Guest Processes Using a Layered Virtualization Architecture, by Udo Steinberg.

Once the identity (e.g., Internet Explorer, Java, Adobe Flash Player, Firefox) of the guest process is determined, the policy manager may render a classification decision for the process (e.g., known good, thus no initial monitoring or unknown, thus undergo light, medium or heavy degree of monitoring) that is used as a basis for establishing a policy associated with the process. The policy may specify various restrictions (access permissions) for the identified process, such as an Internet Explorer (IE) process. For example, since the IE process generally does not execute code from its stack, the policy may specify that all stack pages of the process may be marked as unexecutable. Further, since the IE process generally does not write to its code pages, the policy may specify that code pages of the process may be write-protected. Once the policy is established, the guest monitor 352 decides whether the guest process can be placed into an existing memory view having such access permissions. If so, the guest monitor instructs the micro-hypervisor 320 to bind (associate) the process to an existing memory view. Otherwise, the guest monitor may instruct the micro-hypervisor to create a new memory view for the process with newly specified (e.g., tightened or relaxed) access permissions for certain memory pages. In addition, the guest monitor may instruct the policy manager 356 to create a new protection profile 520 for the process. The protection profile 520 may then be populated with appropriate information as previously described: (i) the identifier of the process 522, (ii) types of process events that the virtualization layer is to intercept, (iii) a pointer 524 to the NPT hierarchy bound to the process, and (iv) access restrictions to memory.

In an embodiment, a memory view is associated with (bound to) a nested page table (NPT) hierarchy by the guest monitor using the protection profile. Note that the micro-hypervisor has no knowledge as to which guest process runs in which memory view as only the guest monitor has such knowledge (e.g., which protection profile is associated with which guest process), and the guest monitor has no knowledge as to which NPT hierarchy is associated with which memory view as the protection profile binds the NPT hierarchy to the memory view. The guest monitor 352 may observe switching by the guest operating system from one guest process to another by, e.g., monitoring a virtual control register CR3 (e.g., intercepting write accesses to the virtual control register), as described in U.S. patent application Ser. No. 15/230,215 titled, Technique for Protecting Guest Processes Using a Layered Virtualization Architecture. Upon observing the guest operating system switching to another guest process, the guest monitor may instruct the micro-hypervisor 320 to activate the memory view (i.e., switch to the NPT hierarchy) associated with (bound to) the guest process via the protection profile. For example in response to observing the guest operating system switching to agent 360 (associated with identifier 522x), the guest monitor may instruct the micro-hypervisor to activate memory view 510c and the micro-hypervisor switches to NPT 430c as referenced by the protection profile 520x that identifies the agent, which changes the physical memory layout of the process.

A policy decision may be subsequently rendered to move the guest process into a separate memory view having another protection profile 520d with tightened memory protection to enable exploit detection monitoring of the process. For example, guest process 240d may be created to run with more restrictive memory protection than that provided for by the default memory view (e.g., memory view 510a). Accordingly, the guest monitor 352 may cooperate with the threat protection component 354 of the virtualization layer 310 to instruct the micro-hypervisor to create a new memory view (e.g., memory view 510b). In response, the micro-hypervisor 320 may spawn memory view 510b by creating a new set of NPTs (hierarchy) 430b, such that there are two memory views: 510a (the default memory view) and 510b. The guest monitor then associates guest process 240d with memory view 510b using the protection profile 520d (e.g., the pointer 524d is updated to reference the NPT hierarchy 430b).

Based on certain monitoring criteria for exploit detection, the threat protection component 354 may instruct the guest monitor to migrate (e.g., move) a guest process 240 to a more restrictive memory view. The guest process may then undergo scrutiny (e.g., instrumentation and monitoring) within the restrictive memory view, wherein certain memory pages may be write protected, execute protected or read protected. The virtualization layer 310 can observe the behavior of the guest process, e.g., how it reacts to the instrumentation and monitoring. If such monitoring indicates that the guest process is not malicious, the threat protection component may decide to move the process back to the less restrictive (e.g., default) memory view.

In an embodiment, the decision to move a guest process from one memory view to another may be based on multiple factors, such as the identity of the process. For example, the threat protection component 354 may identify the process (e.g., Adobe Flash Player) as known to have vulnerabilities. To be safe, the threat protection component 354 may initially declare the process as suspicious and move the process into a memory view with tightened restrictions to observe its behavior. Another factor may be based on observation of certain behavior. For example, the threat protection component (and the guest monitor) may observe that the guest process writes to operating system data structures or certain areas of memory that it should not. To determine whether this behavior is malicious, the threat protection component 354 may instruct the guest monitor 352 to move the guest process to a separate memory view (not shared with other processes) (not shown) where access permissions to the memory pages are tightened so as to observe and analyze content written by the process (including the memory location to which such content is written). If it is determined that the process is innocuous (not writing anything harmful) the threat protection component may instruct the guest monitor to move the process back to the default memory view 510a.

In an embodiment, other components of the virtualization architecture may influence the migration decision. Note that the agent 360 may have built-in exploit detection capabilities (as does the threat protection component 354) such that exploit detection functionality is distributed among the components of the architecture. Distributed exploit detection functionality may influence the decision to place a guest process in a certain memory view. The decision may be based on the type of monitoring (and instrumenting) that the component performs.

While there have been shown and described illustrative embodiments for implementing memory views using a virtualization layer of a virtualization architecture executing on a node of a network environment, it is to be understood that various other adaptations and modifications may be made within the spirit and scope of the embodiments herein. For example, embodiments have been shown and described herein with relation to migration (e.g., movement) of a guest process to a more restrictive memory view based on certain monitoring criteria for exploit detection. However, the embodiments in their broader sense are not so limited, and may, in fact, provide for movement of a guest process to a less restrictive memory view (if possible) because memory views with tightened access restrictions (e.g., memory pages that are write-protected) may be costly in terms of time and performance overhead.

In an embodiment, sub-page memory protection may be provided. For example, assume a critical operating system data structure is co-located with a separate data structure on a same memory page to which a guest process can legitimately write. If it is desirable to protect the critical data structure and the process is not trusted, a critical portion of the memory page (or the entire page) may require protection (i.e., a portion containing the critical data structure). Assume the smallest granularity of protection is illustratively a 4 KB page. If the guest process writes to a noncritical portion (not containing the critical data structure) of that page, a NPT violation is triggered in host mode (the virtualization layer) which then emulates the instruction and resulting side effects. Accordingly, there may be performance overhead associated with protecting memory pages and emulating write instructions to determine, e.g., if the write operation is legitimate and, if so, emulate the side effects of the instruction in the virtualization layer. Such emulation may be costly (expensive) in terms of time and performance overhead. Therefore, the more restrictions applied to a guest process the higher the overhead to the virtualization layer. It is thus desirable to apply restrictive memory views judiciously (with great care) and only when necessary.

Advantageously, the assignment of guest processes to memory views (micro-VMs) is flexible and efficient. For example, guest processes that belong to a particular (default) protection profile 520*a-c* may run in memory view 510*a* where the entire memory is visible, e.g., in guest mode, and no permissions have been overridden. Certain other guest processes may require a higher degree of protection/monitoring and may be assigned to memory view 510*b* where the guest monitor 352 may tighten (i.e., restrict) permission to certain memory pages as provided by protection profiles 520*d,e*. Likewise, certain trusted processes, such as agent 360, may be assigned to memory view 510*c* where certain memory pages are visible (i.e., accessible) that are not visible in the other memory views as provided by protection profile 520*x*. In sum, one or more guest processes may be assigned to each memory view and a guest process may also be reassigned from one memory view to another via update to the protection profile pointer 524 of the protection profile 520 associated with that guest process.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a memory to store a guest process, a guest operating system kernel and a virtualization layer;
   a memory management unit (MMU) coupled to the memory and including a guest page table hierarchy associated with the guest process; and
   a central processing unit (CPU) coupled to the MMU, the CPU to execute the guest process, the guest operating system kernel and the virtualization layer, the virtualization layer when executed operable to:
   classify the guest process when the guest operating system kernel switches to the guest process for execution on the CPU;
   bind a first memory view to the guest process based on the classification of the guest process; and
   activate the first memory view bound to the guest process, the first memory view used as a container for the guest process, the first memory view using a first nested page table hierarchy to constrain access to the memory while the guest process is active.

2. The system of claim 1 wherein the virtualization layer when executed is further operable to:
   associate a protection profile with the guest process, wherein the protection profile includes an identifier of the guest process and a pointer to the first nested page table hierarchy.

3. The system of claim 2 wherein the protection profile further includes types of process events that the virtualization layer intercepts while the guest process is active.

4. The system of claim 2 wherein the virtualization layer when executed is further operable to:
   monitor the guest process for exploit detection; and
   migrate the guest process to a second memory view, wherein the second memory view is more restrictive than the first memory view.

5. The system of claim 4 wherein the virtualization layer when executed is further operable to:
   update the pointer of the protection profile to reference a second nested page table hierarchy associated with the second memory view.

6. The system of claim 1 wherein the virtualization layer when executed is further operable to:
   determine whether the guest process is identified as having a known vulnerability; and
   in response to determining that the guest process is identified to have the known vulnerability, migrate the guest process to a second memory view, wherein the second memory view is more restrictive than the first memory view.

7. The system of claim 4 wherein the virtualization layer when executed is further operable to:
   determine whether the guest process is malicious; and
   in response to determining that the guest process is not malicious, migrate the guest process to the first memory view.

8. The system of claim 2 wherein the protection profile includes restrictions for a sub-page portion of the first nested page table hierarchy.

9. The system of claim 8 wherein the virtualization layer when executed is further operable to:
set a first access permission on a first sub-page portion of a memory page, the first access permission more restrictive than a second access permission on a second sub-page portion of the memory page accessed by the guest process.

10. The system of claim 1 wherein the first memory view is combined with the guest page hierarchy organized as shadow pages.

11. A method comprising:
storing a guest page table hierarchy associated with a guest process in a memory management unit (MMU) of a node having a memory and a central processing unit (CPU), the CPU to execute the guest process, a guest operating system kernel and a virtualization layer;
classifying the guest process when the guest operating system kernel switches to the guest process for execution on the CPU;
binding a first memory view to the guest process based on the classification of the guest process; and
activating the first memory view bound to the guest process, the first memory view used as a container for the guest process, the first memory view using a first nested page table hierarchy to constrain access to the memory while the guest process is active.

12. The method of claim 11 further comprising:
associating a protection profile with the guest process, wherein the protection profile includes an identifier of the guest process and a pointer to a first nested page table hierarchy associated with the first memory view.

13. The method of claim 12 wherein the protection profile further includes types of process events that the virtualization layer intercepts while the guest process is active.

14. The method of claim 12 further comprising:
monitoring the guest process for exploit detection; and
migrating the guest process to a second memory view, wherein the second memory view is more restrictive than the first memory view.

15. The method of claim 14 further comprising:
updating the pointer of the protection profile to reference a second nested page table hierarchy associated with the second memory view.

16. The method of claim 11 further comprising:
determining whether the guest process is identified as having a known vulnerability; and
in response to the determining that the guest process is identified to have the known vulnerability, migrating the guest process to a second memory view, wherein the second memory view is more restrictive than the first memory view.

17. The method of claim 14 further comprising:
determining whether the guest process is malicious; and
in response to determining that the guest process is not malicious, migrating the guest process to the first memory view.

18. The method of claim 12 wherein the protection profile includes restrictions for a sub-page portion of the first nested page table hierarchy.

19. The method of claim 18 further comprising:
accessing by the guest process a first sub-page portion of a memory page of the memory, wherein a second sub-page portion of the memory page has more restrictive access permissions than the first sub-page portion.

* * * * *